— 
United States Patent Office 2,792,327
Patented May 14, 1957

---

2,792,327
METHOD OF CONTROLLING PLANT FUNGI WITH SODIUM MONOMETHYL DITHIOCARBAMATE

Madison Hunt, Claymont, Del., assignor to E. I. du Pont de Nemours and Company, Wilmington, Del., a corporation of Delaware No Drawing. Application August 25, 1955,
Serial No. 530,631

1 Claim. (Cl. 167—22)

This invention relates to a method employing sodium monomethyl dithiocarbamate for the prevention and control of fungus infestation of living vegetation.

I have discovered that fungi infestation can be prevented or controlled by the method comprising applying sodium monomethyl dithiocarbamate to the locus of the vegetation to be treated for the control of fungi. This method can be used, for example, to treat living plants such as crop plants, ornamental plants, and fruit-bearing trees. Also, it can be used in treating plant seeds.

In my method the active ingredient can be applied to the locus of the vegetation by applying it directly to the plant foliage or on plant seeds, by mixing it with fertilizer that is applied to the vegetation, or in any other manner that controls fungi attack of the vegetation to be protected.

In my fungicidal method, sodium monomethyl dithiocarbamate is applied to the locus to be treated for the control of fungi at a dosage sufficient to exert fungicidal action. In general, in application as a foliar spray, a dosage or rate in general from about 1 to 4 pounds per acre of sodium monomethyl dithiocarbamate is employed. In application to seed, usually a dosage of from about 0.5 to 3 oz. per 100 pounds of seed is used. Usually from about .005 to .02 pound of sodium monomethyl dithiocarbamate is used per pound of organic matter treated. Of course, where a material is being treated only part of which is subject to infestation, such as wood, the required dosage is determined on the basis of the amount of the organic material that is actually exposed to attack.

The optimum dosage, of course, is largely determined by and dependent upon the particular material to be treated, the method of application, and, in the case of application to vegetation and seeds, the susceptibility of the particular vegetation to sodium monomethyl dithiocarbamate, the state and condition of growth of the vegetation to be treated, and the climatic conditions. The optimum amount to be applied in each case can be determined readily by those skilled in the art by conventional means.

The sodium monomethyl dithiocarbamate employed in my method can be prepared by any of the conventional methods. Thus, it can be prepared by reacting in an aqueous medium stoichiometric amounts of monomethylamine, carbon disulfide and sodium hydroxide. The aqueous solutions resulting from the preparation of sodium monomethyl dithiocarbamate in this manner are highly suited for direct application to the organic matter to be treated for the control of fungi.

In order that this invention can be better understood, the following examples in addition to those set forth above are given:

Example 1

A 2% by weight agar solution containing 2½% by weight of malt was prepared. Varying amounts of sodium monomethyldithiocarbamate were added to samples of the agar mix while it was hot and in the liquid state. Following preparation, the agar samples were poured into Petri dishes and allowed to cool and solidify.

The surfaces of the agar samples were then inoculated with spores of *Aspergillus niger* and *Penicillium* species. The Petri dishes were then incubated at 76–78° F. No fungus growth was observed after 3 days in those Petri dishes containing at least 1/20 of 1% sodium monomethyl dithiocarbamate.

Example 2

Six week old tomato plants of the Bonny Best variety were sprayed to runoff with a .02% aqueous solution of sodium monomethyldithiocarbamate. This solution also contained 12 drops per gallon of a dispersant mixture comprising sodium sulfates of mixed long chain alcohol fatty acid esters and diethylene glycol abietate supplied by E. I. du Pont de Nemours and Company under the proprietary name "Spreader Sticker."

After the spray deposit dried the plants were exposed to late blight fungus (*Pythophthora infestants*). It was found that the thusly treated tomato plants developed less than ¼ the number of fungi lesions as did a control group of untreated tomato plants that were exposed to the fungus under identical conditions.

Example 3

Three week old bean plants of the Pinto variety were sprayed to runoff with .004% aqueous solution of sodium monomethyl dithiocarbamate. This solution also contained 12 drops per gallon of a dispersant mixture comprising sodium sulfates of mixed long chain alcohol fatty acid esters and diethylene glycol abietate supplied by E. I. du Pont de Nemours and Company under the proprietary name "Spreader Sticker."

After the spray deposit dried the plants were exposed to the rust fungus (*Uromyces appendiculatus*). It was found that the thusly treated bean plants developed less than ½ the number of fungi lesions as did a control group of untreated bean plants that were exposed to the fungus under identical conditions.

I claim:

A method for the control of fungus infestation of living vegetation comprising applying sodium monomethyl dithiocarbamate to the locus of the vegetation to be protected.

References Cited in the file of this patent

FOREIGN PATENTS

8103/32    Australia _____ May 4, 1933

OTHER REFERENCES

Roark et al.: List of Organic Sulphur Compounds Used as Insecticides, pp. 3–6 (U. S. D. P. A., May 1935).